United States Patent
Day et al.

(10) Patent No.: US 7,978,840 B2
(45) Date of Patent: Jul. 12, 2011

(54) PROVISIONING SYSTEM FOR NETWORK RESOURCES

(75) Inventors: Ronald D. Day, Richardson, TX (US); Donald Pitchforth, Rockwall, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2254 days.

(21) Appl. No.: 10/705,000

(22) Filed: Nov. 10, 2003

(65) Prior Publication Data

US 2005/0102193 A1 May 12, 2005

(51) Int. Cl.
*H04M 3/42* (2006.01)

(52) U.S. Cl. ......... 379/207.02; 705/26; 705/34; 705/40; 709/220

(58) Field of Classification Search .............. 705/26, 705/40, 28, 29, 34; 379/114.29, 207.02; 709/220
See application file for complete search history.

(56) References Cited

U.S. PATENT DOCUMENTS

| | | | |
|---|---|---|---|
| 7,080,035 B1 * | 7/2006 | Williams et al. | 705/40 |
| 7,302,405 B2 * | 11/2007 | Hoskin et al. | 705/26 |
| 2004/0158507 A1 * | 8/2004 | Meek et al. | 705/28 |
| 2005/0060388 A1 * | 3/2005 | Tatsumi et al. | 709/220 |

* cited by examiner

*Primary Examiner* — Md S Elahee

(57) ABSTRACT

A method and system of provisioning resources installed in a network element. Resources are installed in the network element. As resources are placed into service, a notification is transmitted to the vendor. The vendor generates an invoice, and the service provider generates a purchase order. Furthermore, a capacity planning system may monitor the system as resources are placed into service. If the amount of spare resources fall below a predetermined limit, the capacity planning system may transmit a request to the vendor for the additional equipment. In this manner, resources may be installed prior to the actual need for the resources. The resources may then be paid for by the service provider as the resources are needed and placed into service, thereby enabling a risk-sharing arrangement between the service provider and the vendor.

15 Claims, 2 Drawing Sheets

PROVISIONING SYSTEM FOR NETWORK RESOURCES

TECHNICAL FIELD

The present invention relates to the field of telephony, and more specifically, to a billing and maintenance system for network services in a telephony environment.

BACKGROUND

The telephony network generally comprises one or more switches and network elements. The network elements are generally configured with one or more resources that allow services, such as additional wavelengths, bandwidth, application services, voice mail, single-number services, and the like. As additional services are desired, additional resources are generally installed into the network elements and brought into service such that a customer may begin using the additional resources.

The provisioning of a new service, however, may be time consuming, expensive, and require coordination between a vendor and a service provider. Generally, the service provider negotiates a contract for the purchase and installation of equipment to support a predetermined capacity of one or more services. After purchase, the vendor installs and tests the equipment. It is only after the equipment has been installed and tested that the service provider may offer services and generate income.

The length of time required to perform these actions may result in a loss of revenue and a loss of a competitive advantage. To offset these losses, the service provider generally installs excess capacity or sufficient capacity, such that the service provider believes will be sufficient for a period of time. Installing excess capacity, however, requires a larger initial outlay of funds to purchase the equipment.

Furthermore, this type of system does not lend itself to risk-sharing arrangements between the service provider and the vendor. Because of the cost of purchasing and installing the additional resources, it is desirable to enter into risk-sharing agreements with vendors. Generally, risk-sharing agreements allow the service provider to pay for the resources as the resources are placed into service, rather than paying for the resources as the resources are installed.

Thus, a system and a method are desirable that allow for provisioning of new network services in a fast and cost-effective manner that lends themselves to a risk-sharing agreement.

SUMMARY OF THE INVENTION

These and other problems are generally reduced, solved or circumvented, and technical advantages are generally achieved, by embodiments of the present invention which provide a system and method for provisioning resources in a network environment.

In one embodiment of the present invention, a provisioning system receives a notification that a resource has been placed into service. The provisioning system causes a request for an invoice to be generated and transmitted to a vendor. Upon receipt of the invoice from the vendor, the provisioning system causes a purchase order to be generated.

In another embodiment of the present invention, a capacity planning system receives notification that a resource has been placed into service. The capacity planning system compares the remaining resources available but not in service with a predetermined threshold. If the remaining resources are below the predetermined threshold, the capacity planning system causes a request for an invoice to be generated and transmitted to a vendor. Upon receipt of the invoice from the vendor, the capacity planning system causes a purchase order to be generated.

In yet another embodiment of the present invention, a system having a provisioning system communicatively coupled to a network element is provided. The provisioning system receives a notification that a resource of the network element has been placed into service and transmits a second notification to the vendor.

The system may also have a capacity planning system communicatively coupled to the network element. The capacity planning system generates a third notification when the amount of available resources falls below a predetermined limit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, the provisioning of additional wavelengths in a SONET telephony network. The invention may also be applied, however, to other services that require the provisioning of additional hardware or software capabilities to enable the services, such as T1 lines, satellite services, application services and the like.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
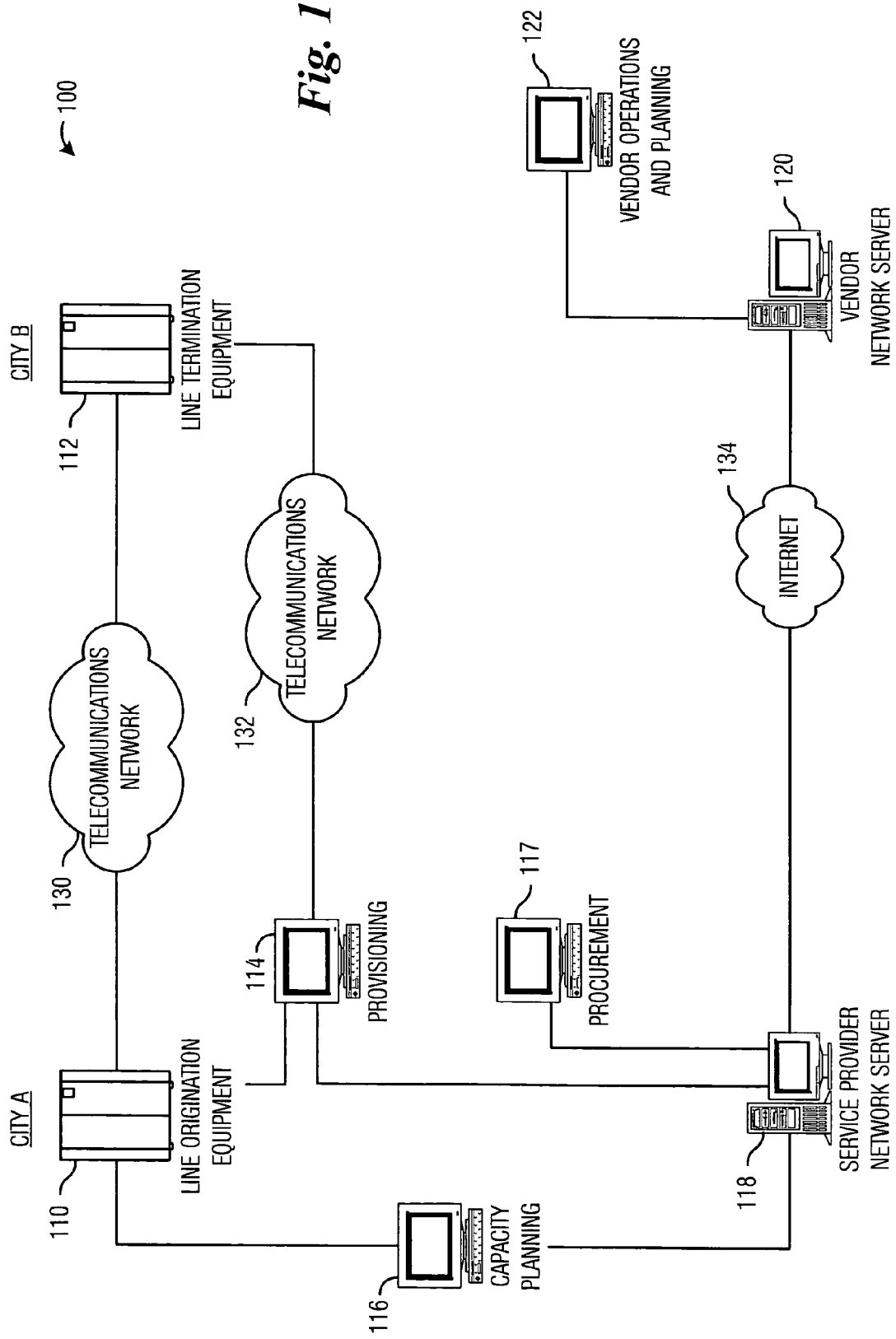
FIG. 1 is a network diagram depicting elements embodying features of the present invention.

Referring now to FIG. 1, reference numeral 100 designates a network diagram of a portion of a telephony network embodying features of one embodiment of the present invention. It should be noted that one of ordinary skill in the art will realize that the network diagram 100 has been simplified to better illustrate features of the present invention. Well-known elements have not been shown, but are nonetheless part of a telephony network embodying features of the present invention. For example, a network embodying the present invention may include amplifiers, power supplies, maintenance systems, gateways, routers, firewalls, and the like.

The network diagram 100 comprises line origination equipment 110, line termination equipment 112, a provisioning system 114, a capacity planning system 116, a procurement system 117, a service provider network server 118, a vendor network server 120, and a vendor operations and planning system 122. The line origination equipment 110 and the line termination equipment 112 are communicatively coupled via a first telecommunications network 130. The first telecommunications network 130 may be, for example, a network such as the Internet, a local-area network (LAN), a wide-area network (WAN), a Public-Switched Telephone Network (PSTN), a wireless communications network, or the like, for providing communication services between the line origination equipment 110 and the line termination equipment 112. In one embodiment, the line origination equipment 110 may be located in a first city (indicated in FIG. 1 by the label "City A"), and the line termination equipment 112 may be located in a second city (indicated in FIG. 1 by the label "City B").

In the embodiment in which the first telecommunications network 130 is a fiber optic transmission network, the line origination equipment 110 and the line termination equipment 112 may include a dense wave division multiplexer (DWDM), and the first telecommunications network 130 may include a series of optical amplifiers. As is known in the art, the fiber optic transmission network is capable of providing communications over multiple wavelengths. For each wavelength used, the DWDM is generally equipped with high-capacity multiplexers/de-multiplexers.

The provisioning system 114 is communicatively coupled to the line origination equipment 110 and the line termination equipment 112, such that the provisioning system 114 receives status information from the line origination equipment 110 and the line termination equipment 112. The status information may include, for example, the total number of wavelengths installed and the number of wavelengths in service.

It should be noted that the provisioning system 114 is preferably communicatively coupled to the line termination equipment 112 via a second telecommunications network 132 separate from the first telecommunications network 130. The second telecommunications network 132 may be, for example, a network such as the Internet, a LAN, WAN, PSTN, wireless communications network, or the like. In the preferred embodiment, the first telecommunications network 130 and the second telecommunications network 132 utilize the PSTN, but use different routes. In this manner, if the first telecommunications network 130 fails, then the provisioning system 114 would likely remain communicatively coupled to the line termination equipment 112.

Additionally, the provisioning system 114 is communicatively coupled to the service provider network server 118 such that the provisioning system 114 may indicate to the service provider network server 118 when new services, wavelengths, or other provisionable resources have been placed into service.

The capacity planning system 116 and the procurement system 117 are preferably communicatively coupled to the service provider network server 118. The capacity planning system 116 communicates to the service provider network server 118 information regarding the need for additional equipment to be installed in the line origination equipment 110, the line termination equipment 112, or elsewhere to provide for expected growth and increased capacity. Generally, the capacity planning system 116 utilizes growth models and predicts when additional equipment should be installed and the amount of additional equipment that should be installed. The procurement system 117 preferably handles the generation of invoices and purchase orders, and initiates payment for goods and services received.

The service provider network server 118 is communicatively coupled to the vendor network server 120 via the Internet 134. It should be noted that FIG. 1 illustrates the preferred embodiment in which the Internet 134 is utilized for communications between the service provider network server 118 and the vendor network server 120. Alternatively, other types of communications links may be used, such as, for example, a direct link, a dial-up connection, a satellite connection, other wireless connections, or the like.

The vendor network server 120 is communicatively coupled to the vendor operations and planning system. The vendor operations and planning system 122 interacts with the service provider network server 118 to generate invoices and purchase orders for equipment or services placed into service.

Preferably, the provisioning system 114, the capacity planning system 116, the procurement system 117, and the service provider network server 118 are preferably communicatively coupled via an internal data network (IDN), such as a LAN, WAN, or the like, utilizing common communications protocols, such as TCP/IP. In this configuration, each component may issue a machine-to-machine language (MML) request to establish a communications channel as is known in the art. Thereafter, normal hyper-text markup language (HTML) or TL1 commands may be used to communicate. Generally, HTML is used to communicate with the service provider network server 118, and TL1 commands are used for communications between other network elements.

Figure 2:
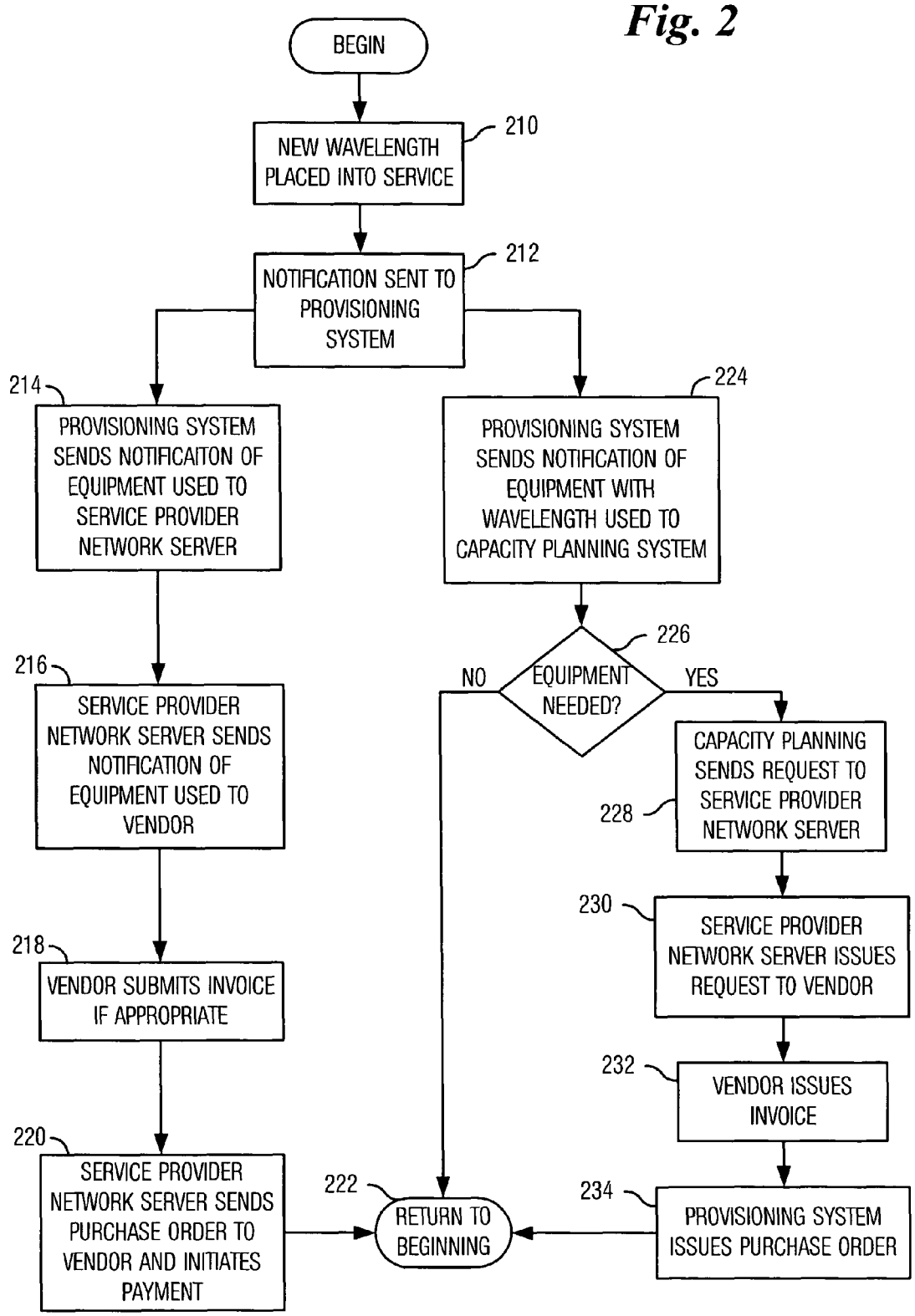
FIG. 2 is a data flow diagram depicting steps that may be performed to provision additional services in a network environment in accordance with one embodiment of the present invention.

FIG. 2 is a data flow diagram depicting steps that may be performed in accordance with one embodiment of the present invention. FIG. 2 discusses the operation of one embodiment of the present invention in which a wavelength is placed into service. One skilled in the art, however, will realize that the process described may be used for other types of resources, such as digital cross connects, data platforms, frame relays, ATMs, routers, and the like. The process begins in step 210, wherein a new wavelength, or other equipment or service, is placed into service. Generally, placing a wavelength into service requires a craft engineer to place the wavelength into a maintenance state. Tests are performed on the equipment and the wavelength for a specified period of time, usually about 72 hours. Upon successful completion of the tests, the wavelength, or other equipment or service, is placed into full service in which the wavelength is allowed to be used for normal user traffic.

In step 212, after the wavelength has been placed into full service, the line origination equipment 110 and/or the line termination equipment 112 transmits a notification to the provisioning system 114 indicating that the wavelength is prepared for customer use. The provisioning system 114 then enables the wavelength for customer use.

Processing then preferably proceeds along independent parallel paths, as indicated by the paths beginning with steps 214 and 224. Generally, the path beginning with step 214 processes the new wavelength and initiates the process of generating an invoice and a purchase order for the new wavelength and the equipment associated to the new wavelength. The path beginning with step 224 determines whether additional equipment should be added to prepare for additional capacity at a later date.

Referring to the first path beginning in step 214, the provisioning system 114 transmits notification of the additional equipment placed into service to the service provider network server 118. Upon receipt, the service provider network server 118 transmits a notification to the vendor of the additional equipment that has been placed into service. Preferably, the notification is transmitted to the vendor via an email message transmitted over the Internet 134. Alternatively, the notification may be sent by facsimile, postal mail, voice mail, or the like transmitted over the PSTN, wireless communications network, LAN, WAN, direct connection, or the like.

In step 218, the vendor submits an invoice to the service provider if the additional equipment has not yet been invoiced. Preferably, the vendor submits the invoice via the vendor operations and planning system 122 and the vendor network server 120. The invoice is preferably submitted electronically, but may also be submitted by facsimile, postal mail, voice mail, or the like transmitted over the PSTN, wireless communications network, LAN, WAN, direct connection, or the like.

In step 220, the invoice is received by the procurement system 117 via the service provider network server 118. The procurement system 117 processes the invoice and generates a purchase order, thereby initiating payment for the goods and/or services received. The purchase order is transmitted from the procurement system 117 to the vendor operations and planning system 122 via the service provider network server 118 and the vendor network server 120. Preferably, this step is performed automatically without human intervention. It may be desirable, however, to require approval or other human interaction on some or all transactions.

Thereafter, in step 222 processing returns to the beginning wherein the process is repeated for the next wavelength placed into service.

Regarding the parallel path, processing begins in step 224, wherein the line origination equipment 110 and/or the line termination equipment 112 transmits notification of the equipment or wavelength placed into service to the capacity planning system 116. The capacity planning system 116 determines whether or not sufficient spare resources remain available or if additional equipment should be purchased and installed such that sufficient resources will be available to meet future demands.

Accordingly, in step 226, a determination is made whether or not additional equipment should be purchased and installed. If a determination is made that additional equipment should not be purchased and installed at this time, then processing proceeds to step 222 wherein processing returns to the beginning.

If, on the other hand, a determination is made that additional equipment is needed, then processing proceeds to step 228, wherein the capacity planning system 116 transmits a request for an invoice to the service provider network server 118. In step 230, the service provider network server 118 forwards the request for an invoice to the vendor network server 120 and vendor operations and planning system 122 via the Internet 134.

Upon receiving the request for invoice, in step 232 the vendor operations and planning system 122 determines the resources needed, such as equipment, personnel, and the like, and generates an invoice for the goods and services. The invoice is transmitted from the vendor operations and planning system 122 to the procurement system 117. The procurement system, in step 234, responds by issuing a purchase order. Thereafter, the equipment may be installed and tested.

As one of ordinary skill in the art will appreciate, embodiments of the present invention provide automatic notification of equipment and services placed into service. It should also be appreciated that such a system allows for efficient cost-sharing and risk-sharing arrangements to be implemented. For example, embodiments of the present invention may be used in which the vendor installs equipment into the service providers network. As capabilities are utilized, invoices and purchase orders are automatically generated to effect payment of the services. Furthermore, by having the equipment installed previously, the additional capabilities may be brought into full service in a minimal amount of time. Thus, the service provider is able to maintain a competitive advantage and compete cost-effectively with competitors.

Although particular embodiments of the invention have been described in detail, it is understood that the invention is not limited correspondingly in scope, but includes all changes, modifications, and equivalents coming within the spirit and terms of the claims appended hereto. For example, the functionality described herein may be combined into fewer network elements, the functionality described herein may be divided into additional network elements, different types of networks, messages, and protocols may be used, and the like. Accordingly, it is understood that this invention may be extended to other structures and materials, and thus, the specification and figures are to be regarded in an illustrative rather than a restrictive sense.

What is claimed is:

1. A telecommunications network management system comprising:
   a first network element communicatively coupled to a telecommunications network;
   a provisioning system communicatively coupled to the first network element,
   where the first network element transmits, over said telecommunications network and to the provisioning system, a first notification message indicating that a resource provided by a vendor has been enabled, and where the provisioning system transmits a second notification, to the vendor, indicating that the resource has been enabled; and
   a procurement system, where the procurement system receives an invoice from the vendor based on the second notification.

2. The telecommunications network management system of claim 1, where the second notification is transmitted electronically to a vendor computer system.

3. The telecommunications network management system of claim 1, where the first network element includes a line termination element or a line origination element.

4. The telecommunications network management system of claim 1, where the telecommunications network comprises a SONET network.

5. The telecommunications network management system of claim 1, where the provisioning system is communicatively coupled to a system associated with the vendor via the Internet.

6. The telecommunications network management system of claim 1, where the procurement system issues purchase orders as resources provided by the vendor are enabled.

7. The telecommunications network management system of claim 1, where the procurement system is to transmit to the vendor a purchase order.

8. The telecommunications network management system of claim 1, where the provisioning system is communicatively coupled to a second network element, the second network element being communicatively coupled to the first network element.

9. A method, comprising:
   transmitting, by a first network element and over a telecommunications network, a first notification to a provisioning system, the first notification indicating that a resource provided by a vendor has been enabled;

transmitting, by the provisioning system, a second notification to the vendor indicating that the resource has been enabled; and receiving, at a procurement system, an invoice from the vendor based on the second notification.

10. The method of claim 9, where transmitting the second notification to the vendor includes electronically transmitting the second notification to a computer system of the vendor.

11. The method of claim 9, where the first network element includes a line termination element or a line origination element.

12. The method of claim 9, where the provisioning system is communicatively coupled to a system associated with the vendor via the Internet.

13. The method of claim 9, further comprising:
issuing, by the procurement system, purchase orders as resources provided by the vendor are enabled.

14. The method of claim 9, further comprising:
transmitting, by the procurement system, a purchase order to the vendor.

15. The method of claim 9, where the provisioning system is communicatively coupled to a second network element, the second network element being communicatively coupled to the first network element.

* * * * *